US012729723B2

(12) United States Patent
Schweitzer et al.

(10) Patent No.: US 12,729,723 B2
(45) Date of Patent: Sep. 8, 2026

(54) MECHANICAL ROLLER BEARING

(71) Applicant: SAFRAN AIRCRAFT ENGINES, Paris (FR)

(72) Inventors: Laurent Schweitzer, Moissy-Cramayel (FR); Mathias Gautier, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 115 days.

(21) Appl. No.: 18/706,473

(22) PCT Filed: Nov. 14, 2022

(86) PCT No.: PCT/FR2022/000103

§ 371 (c)(1),
(2) Date: May 1, 2024

(87) PCT Pub. No.: WO2023/089247

PCT Pub. Date: May 25, 2023

(65) Prior Publication Data

US 2024/0418214 A1 Dec. 19, 2024

(30) Foreign Application Priority Data

Nov. 16, 2021 (FR) ...................................... 2112091

(51) Int. Cl.
*F16C 39/02* (2006.01)
*F16C 19/20* (2006.01)
(Continued)

(52) U.S. Cl.
CPC .............. *F16C 39/02* (2013.01); *F16C 19/20* (2013.01); *F16C 19/40* (2013.01);
(Continued)

(58) Field of Classification Search
CPC ...... F16C 19/20; F16C 19/40; F16C 33/3706; F16C 33/372; F16C 33/3831; F16C 33/4611; F16C 39/02
See application file for complete search history.

(56) References Cited

U.S. PATENT DOCUMENTS 2,071,797 A 2/1937 Kifer
6,471,408 B1 10/2002 Ikeda et al.
(Continued)

FOREIGN PATENT DOCUMENTS

DE 199 59 499 A1 6/2001
EP 3 382 222 A1 10/2018
(Continued)

OTHER PUBLICATIONS

Translation of JP2006-138447 obtained Oct. 22, 2025.*
(Continued)

*Primary Examiner* — James Pilkington
(74) *Attorney, Agent, or Firm* — Christensen O'Connor Johnson Kindness PLLC

(57) ABSTRACT

A mechanical roller bearing comprising two bearing races each having a rolling track, rolling elements arranged between the races, the rolling elements being able to roll against a portion of the rolling tracks, the rolling elements being made of a defined material, wherein it includes a plurality of intermediate blocks arranged between the races, the intermediate blocks being made of a material having a greater stiffness than the stiffness of the material of the rolling elements in directions normal to the rolling tracks, and, when the bearing is subjected to loading below a threshold load, the intermediate blocks have a smaller dimension than the rolling elements in directions normal to the rolling tracks, the races having a greater stiffness than the rolling elements.

19 Claims, 7 Drawing Sheets

(51) Int. Cl.

| | |
|---|---|
| ***F16C 19/40*** | (2006.01) |
| ***F16C 33/37*** | (2006.01) |
| ***F16C 33/372*** | (2006.01) |
| ***F16C 33/38*** | (2006.01) |
| ***F16C 33/46*** | (2006.01) |

(52) U.S. Cl.

CPC ........ *F16C 33/3706* (2013.01); *F16C 33/372* (2013.01); *F16C 33/3831* (2013.01); *F16C 33/4611* (2013.01)

(56) References Cited

U.S. PATENT DOCUMENTS

| | | | | |
|---|---|---|---|---|
| 6,499,374 | B1 * | 12/2002 | Ohga | F16C 19/20 74/424.82 |
| 11,493,089 | B2 * | 11/2022 | Maiwa | F16C 33/32 |
| 2019/0301435 | A1 * | 10/2019 | Sørensen | F16C 33/6629 |

FOREIGN PATENT DOCUMENTS

| | | | | |
|---|---|---|---|---|
| JP | H1047359 | * | 2/1998 | |
| JP | 2006138447 A | * | 6/2006 | F16C 19/20 |
| WO | 93/04293 A1 | | 3/1993 | |

OTHER PUBLICATIONS

International Search Report mailed Jan. 4, 2023, issued in corresponding International Application No. PCT/FR2022/000103, filed Nov. 14, 2022; 7 pages.

Written Opinion mailed Jan. 4, 2023, issued in corresponding International Application No. PCT/FR2022/000103, filed Nov. 14, 2022; 9 pages.

* cited by examiner 42
4
12
48
6
44
49
46

MECHANICAL ROLLER BEARING

CROSS-REFERENCE TO RELATED APPLICATIONS

This application is a National Stage of International Application No. PCT/FR2022/000103, filed Nov. 14, 2022, which claims priority to French Patent Application No. 2112091, filed Nov. 16, 2021, the entire disclosures of which are hereby incorporated by reference in their entirety for all purposes.

TECHNICAL FIELD

Embodiments of the disclosure relate to roller bearings and more particularly to roller bearings rotating at low speed and subjected to extreme occasional loads.

BACKGROUND

Roller bearings are generally used to ensure the precise axial and radial positioning of shafts integral with parts that are to be oriented or slowly rotated.

These roller bearings are composed of an inner bearing race having a rolling track, possibly divided into two rings each bearing half a track; an outer bearing race having a rolling track, possibly divided into two rings each bearing half a track; rolling elements which may be balls or rollers and possibly one or more rolling element separators aiming to ensure good circumferential distribution of the rolling elements within the bearing. The rolling elements may be balls, or cylindrical, tapered, or barrel-shaped rollers.

The bearings involve geometries with Hertzian contacts such as ball/tracks having the shape of torus portions, cylindrical roller/cylindrical tracks, tapered roller/tapered tracks, or barrel-shaped roller/spherical and toroidal tracks. These geometries tend to concentrate contact forces onto very reduced surfaces.

During very high loading at a given position or at a very low speed, the contact pressures between the rolling elements and the tracks may exceed the elastic limit of the materials of the tracks or rolling elements, altering their geometries by brinelling. This brinelling degrades the bearing by creating points of resistance or even play. This is called the Brinell effect.

In order to avoid this type of deterioration, roller bearings are dimensioned to take into account extreme loads, even if these loads are rare. Many roller bearings are therefore overdesigned for the vast majority of their life cycle.

These overdesigned bearings are heavy, bulky, and expensive.

SUMMARY

One aim of this disclosure is to provide a bearing assembly that is better resistant to occasional overloading.

Another aim is to provide a bearing assembly which does not have points of resistance or play after an occasional extreme loading event.

Another aim is to provide a bearing assembly that is lighter while still being capable of supporting significant loads.

Another aim is to provide a bearing assembly that is less bulky and capable of supporting significant loads.

Another aim is to provide a less expensive bearing assembly.

Embodiments of the disclosure relate to a mechanical roller bearing comprising:

two races each having a rolling track, rolling elements arranged between the races, the rolling elements being able to roll against a portion of the rolling tracks, the rolling elements being made of a defined material, wherein the mechanical roller comprises a plurality of intermediate blocks arranged between the races, the intermediate blocks being made of a material having a greater stiffness than the stiffness of the material of the rolling elements at least in directions normal to the rolling tracks, and in that, when the bearing is subjected to loading below a threshold load, the intermediate blocks have a smaller dimension than the rolling elements in directions normal to the rolling tracks.

In some embodiments, the bearing according to the disclosure makes it possible to combine the advantages of a roller bearing and the advantages of a plain bearing, the first ensuring performance during normal operation while remaining sufficiently flexible to deform without damage until coming into contact with the second, which is stiffer and more resistant to overload.

In some embodiments, the intermediate blocks make it possible to fulfill the function of separating and providing good angular distribution of the rolling elements. The intermediate blocks may themselves be positioned by a cage for separating the rolling elements.

The features set forth in the following paragraphs may optionally be implemented. They may be implemented independently of each other or in combination with each other.

The rolling elements are manufactured of a material having sufficient stiffness to allow deformation of the rolling elements within their elastic deformation range at least until the intermediate blocks come in contact with the rolling tracks, when the bearing is subjected to loading exceeding the threshold load.

The intermediate blocks comprise supporting faces located facing the rolling tracks, the supporting faces of the intermediate blocks having a shape complementary to the shape of the rolling tracks.

The intermediate blocks have rounded edges.

The rounded edges have a progressively varying curvature formed by a succession of fixed tangential radii or a continuous differentiable function.

The races have a greater stiffness than the rolling elements.

The intermediate blocks and the rolling elements are arranged so that they alternate.

The intermediate blocks and the races are made of a material among ceramic and steel, and the rolling elements are made of a nickel-titanium alloy.

The intermediate blocks and the races are made of ceramic and the rolling elements are made of steel.

The bearing comprises a bearing cage comprising first cells and second cells, the first cells having a different shape than that of the second cells, the first cells containing the rolling elements and the second cells containing the intermediate blocks.

The intermediate blocks are rigidly secured to the second cells.

The intermediate blocks are mounted to move freely within the second cells, clearance being provided in the second cells around the intermediate blocks.

The intermediate blocks are flexibly secured to the second cells.

The rolling elements have a spherical shape and the shape of the intermediate blocks in cross-section is a square or diamond in which the obtuse angles are rounded with two opposite vertices of rounded shape, the cross-section being along a radial plane.

The rolling elements have the shape of a tapered roller, and the supporting faces of the intermediate blocks have a frustoconical shape.

The rolling elements have the shape of a cylindrical roller or needle, and the supporting faces of the intermediate blocks have a cylindrical shape.

The rolling elements are barrel-shaped rollers facing an outer track having the shape of a sphere portion, and the supporting faces of the intermediate blocks have the shape of a torus portion facing the inner track and of a sphere portion facing the outer track.

Embodiments of the disclosure relate to a turbomachine module comprising a rotating shaft of longitudinal axis X-X, and a mechanical roller bearing for guiding the rotation of the rotating shaft about the longitudinal axis XX, the bearing being in accordance with the characteristics mentioned above.

Embodiments of the disclosure also relate to a turbomachine comprising a turbomachine module in accordance with the characteristics mentioned above.

The turbomachine further comprises a set of parts which rotate slowly or which are to be oriented along an axis which itself rotates about an axis of a rotating main shaft, the parts being exposed to a field of centrifugal acceleration.

DETAILED DESCRIPTION

Figure 1:
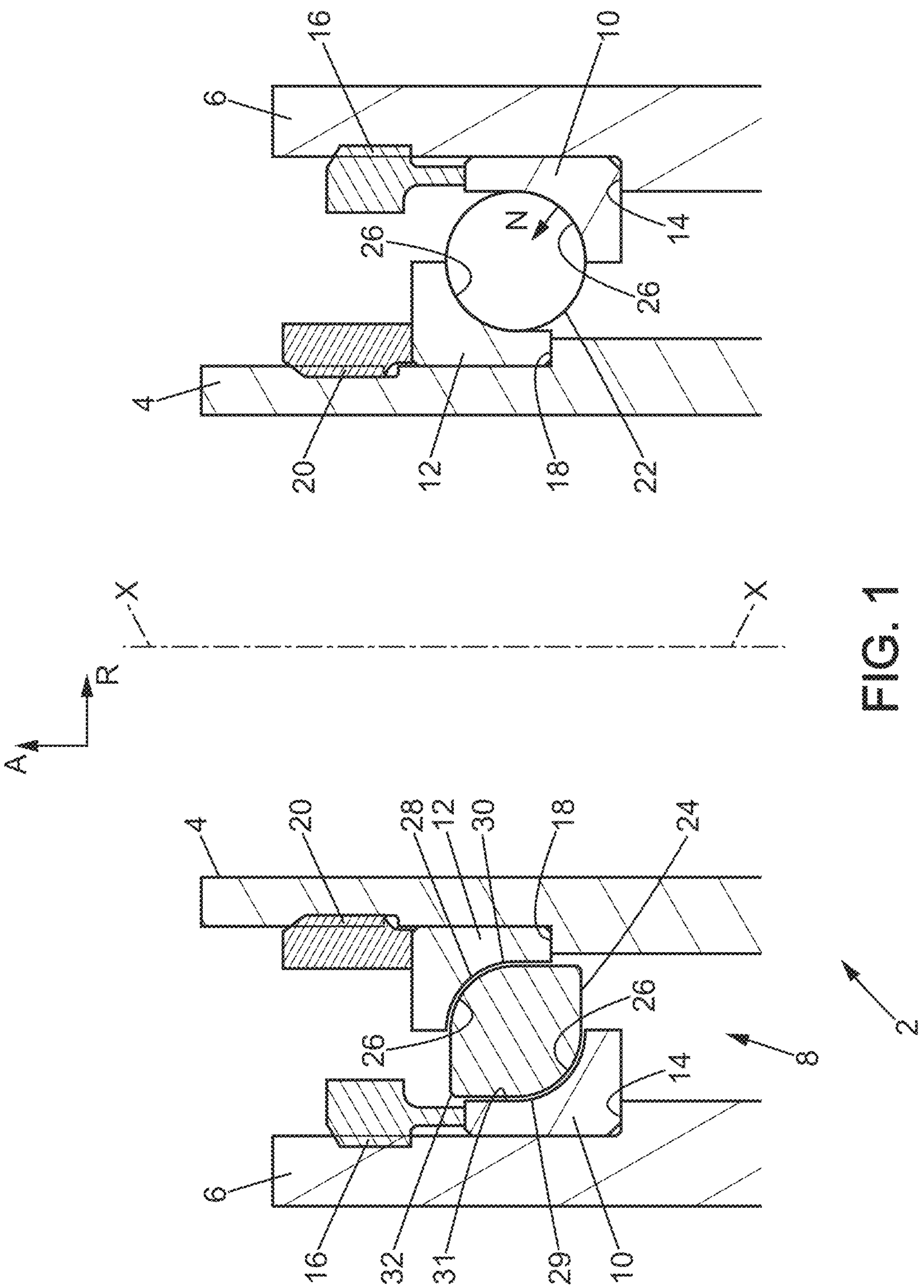
FIG. 1 is a cross-sectional view of a bearing assembly comprising a roller bearing according to a first embodiment of the disclosure, the cross-section being made in a plane radial to the axis of rotation of the bearing.

With reference to FIG. 1, bearing assembly 2 comprises a shaft 4 having an axis of rotation X-X extending in an axial direction A, a hub 6 arranged around the shaft, and a bearing 8 mounted between the shaft and the hub.

Bearing 8 comprises an outer race 10 in tight contact with the hub, an inner race 12 in tight contact with the shaft, and rolling elements 22 and intermediate blocks 24 arranged between the outer race and the inner race.

Figure 2:
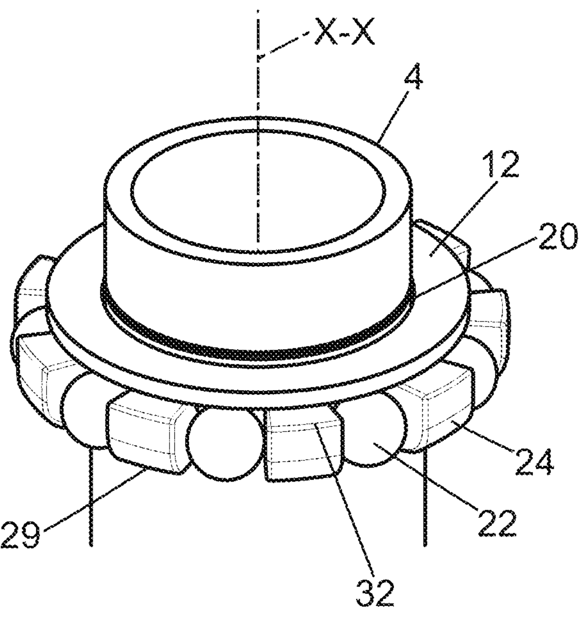
FIG. 2 is a side perspective view of the bearing assembly illustrated in FIG. 1, without the outer race and housing.

With reference to FIG. 2, rolling elements 22 and intermediate blocks 24 are distributed in a circle around the axis of rotation XX. In the embodiment shown in FIG. 2, the rolling elements and the intermediate blocks are arranged so that they alternate. Alternatively, the intermediate blocks and the rolling elements may be distributed differently, for example in a succession of two rolling elements and one intermediate block.

Other distributions may be implemented.

With reference to FIG. 1, outer race 10 abuts against a shoulder 14 provided in the hub. The outer race is held immobile in translation in the axial direction A by a nut 16 screwed into the hub against the outer race. Inner race 12 abuts against a shoulder 18 provided in the shaft. It is held immobile in translation in the axial direction A by a nut 20 screwed into the shaft against the inner race. The outer race and inner race are offset from each other along the axial direction A by a distance which is a function of the size of the rolling elements.

Outer race 10 and inner race 12 each have a face directed towards the rolling elements and the intermediate blocks. This face is called a rolling track 26.

Intermediate blocks 24 have a smaller dimension than rolling elements 22 in directions normal N to the rolling tracks. Thus, clearance 30 is provided between intermediate blocks 24 and rolling tracks 26.

Intermediate blocks 24 are manufactured of a material having a stiffness greater than the stiffness of the material in which rolling elements 22 are manufactured, at least in directions normal N to the rolling tracks. In some embodiments, the intermediate blocks are manufactured as one piece from a single material and this material has a greater stiffness than the stiffness of the material used for the manufacture of the rolling elements.

In some embodiments, outer race 10 and inner race 12 are also made of a material having a stiffness greater than the rolling elements 22.

For example, intermediate blocks 24 and races 10, 12 are made of ceramic or steel, and rolling elements 22 are made of a superelastic alloy such as nickel-titanium for example, also called Nitinol.

According to another example, the intermediate blocks and the races are made of ceramic and the rolling elements are made of steel.

Other materials may be used as long as there is a large difference between the Young's modulus of the rolling elements and the Young's modulus of the intermediate blocks and races. The races do not need to be made of the same material as the intermediate blocks.

Rolling elements 22 are manufactured from a material having sufficient stiffness to allow their deformation within their elastic deformation range, until the intermediate blocks come in contact with the rolling tracks. In other words, the rolling elements are able to deform within their elastic deformation range without entering their plastic deformation range until the clearances 30 between the intermediate blocks and the rolling tracks are occupied, as explained below. The elastic and plastic deformation ranges of the materials are known and will not be described in this patent application.

Figure 3:
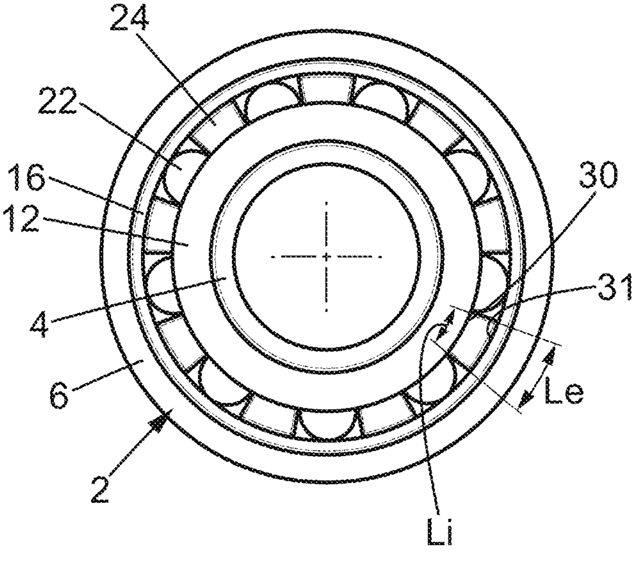
FIG. 3 is a top view of the bearing assembly illustrated in FIG. 1.

Rolling tracks 26 have a shape facilitating the movement of the rolling elements around the axis of rotation X-X and in the axial A and radial directions R. In the embodiment shown in FIGS. 1 to 3, rolling elements 22 have a spherical shape. Rolling tracks 26 have the shape of a torus portion.

Intermediate blocks 24 have faces facing the rolling tracks. These faces are called supporting faces 28, 29 in this patent application. Supporting faces 28, 29 of the intermediate blocks have a shape that in general is complementary to the shape of rolling tracks 26. Thus, in a radial section plane, the intermediate blocks have a square shape having two diagonally opposite vertices of rounded shape forming the supporting faces.

In this embodiment, supporting faces 28,29 of the intermediate block extend to face the entire surface of the portions 31 of the rolling track which are positioned facing this intermediate block. Thus, with reference to FIG. 3, supporting face 28 is superimposed over the entire portion 31 of the rolling track of inner race 12 in the axial A and radial R directions all along the internal width Li of the intermediate block. Similarly, supporting face 29 opposite supporting face 28 is superimposed over the entire portion 31 of the rolling track of outer race 10 in the axial A and radial R directions all along the external width Le of the intermediate block.

The intermediate blocks 22 comprise supporting faces 28, 29 located facing the rolling tracks 26, the supporting faces 28,29 of the intermediate blocks 22 having a shape complementary to the shape of the rolling tracks 26.

Figure 8:
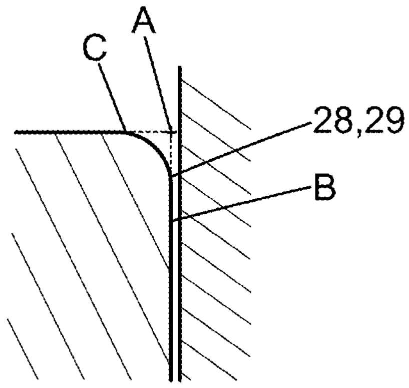
FIG. 8 is a schematic diagram illustrating a first example of the curvature of a supporting face of an intermediate block.
Figure 9:
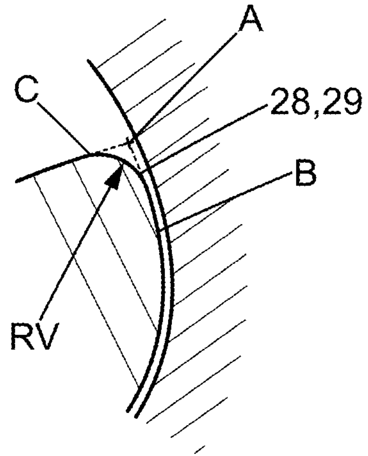
FIG. 9 is a schematic diagram illustrating a second example of the curvature of a supporting face of an intermediate block.
Figure 10:
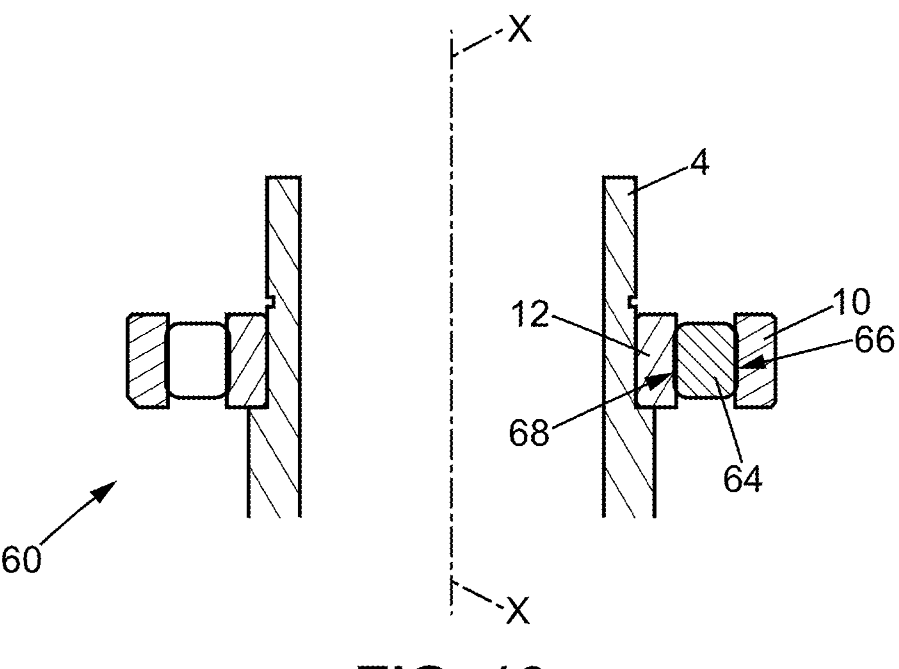
FIG. 10 is a cross-sectional view of a bearing assembly comprising a portion of a roller bearing according to a fourth embodiment of the disclosure, the cross-section being made in a plane radial to the axis of rotation of the bearing.
Figure 11:
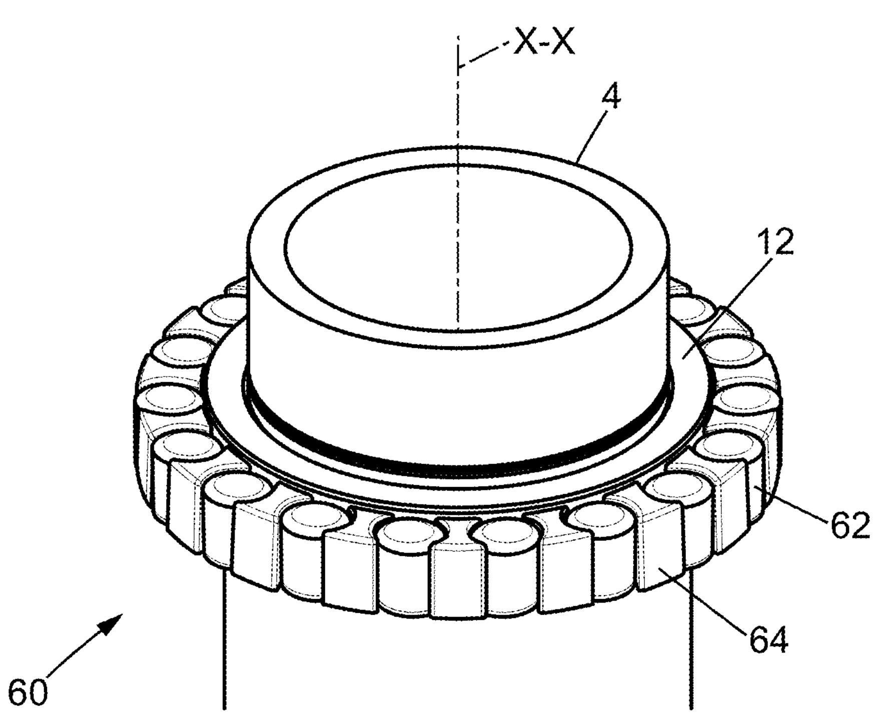
FIG. 11 is a side perspective view of the bearing assembly illustrated in FIG. 10, without the outer race.
Figure 12:
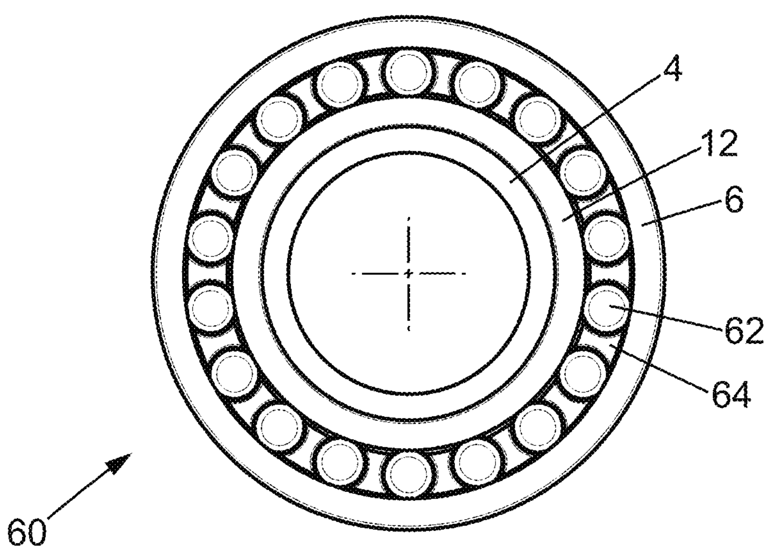
FIG. 12 is a top view of the bearing assembly illustrated in FIG. 10.

Intermediate blocks 22 also have rounded edges 32 that are gradually rounded to avoid overloading at the edges. For this purpose, the radii of curvature of supporting faces 28, 29 evolve according to the proximity of the theoretical edge which would exist in the absence of such removal. This evolution in the radii of curvature may be defined by a mathematical function, for example such as a clothoid function, a logarithmic function, a polynomial function, or an exponential function. The radius of curvature decreases continuously and progressively as it approaches the theoretical edge so as to better avoid the concentration of stresses at the edges of the contacts. FIG. 8 illustrates the edge break and removal principle which allows avoiding edge overpressure relative to a straight section. FIG. 9 illustrates the edge break and removal principle which allows avoiding overpressure at the edges relative to a rounded face. With reference to these FIGURES, instead of shaping the supporting faces of the intermediate block to a theoretical edge illustrated by a point referenced A, the supporting faces 28, 29 follow a curvature illustrated here by a curvature defined between points B and C. This curvature must not have any discontinuity in its tangency. The curvature may vary in stages, for example by a succession of several constant radii, or according to a continuous and differentiable function. It may be defined mathematically by a radius that is a function of the curvilinear abscissa from point B or point C, or even a function of a distance relative to the theoretical shape with no edge break and removal, leading to the theoretical edge A.

During operation, when the load is below a threshold load, the bearing is used in a normal operating mode. Rolling elements 22 roll along the rolling tracks. The rolling elements have close elliptical contact with the rolling tracks via local elastic deformation (Hertzian contact). The intermediate blocks are not simultaneously in contact with the two rolling tracks. There remains some clearance in the direction of contact, between the tracks and the intermediate blocks. When the bearing is subjected to a significant load or violent impact, the bearing is used in what is referred to as "overload" operating mode. The rolling elements and rolling tracks deform while remaining within the limits of their elasticity range. During this deformation, they are pressed against the rolling tracks, which themselves deform elastically around the close contact. The contact between the rolling elements and the rolling tracks becomes a wider and deeper elliptical contact. The clearance 30 between intermediate blocks 24 and rolling tracks 26 is absorbed. Supporting faces 28, 29 of the intermediate blocks come in contact with the rolling tracks. As the supporting faces have a shape complementary to the shape of the rolling tracks, the bearing surface of the intermediate blocks against the rolling tracks is greater than the bearing surfaces between the rolling elements and the rolling tracks. The pressure per unit area is lower. The intermediate blocks are bearing against a larger surface area of the rolling tracks. The intermediate blocks have greater stiffness than the rolling elements. They have greater load resistance. Rolling tracks 26 are only slightly deformed under the intermediate blocks and, overall, including under the rolling elements, are deformed only within their elastic deformation range.

In the embodiment shown, rolling elements 22 are balls. Alternatively, the rolling elements may have a different shape. The rolling elements may for example be cylindrical rollers, tapered rollers, or barrel-shaped rollers.

An operating mode is said to be normal when the applied load is at least three to five times lower than the load of an overload operating mode. An overload operating mode may result in creep or in brinelling of the races and/or rolling elements. The threshold load defining a normal operating mode relative to an overload operating mode depends on the size of the bearing and the materials used to make it. A person skilled in the art is capable of defining this threshold load as well as the normal operating mode and the overload operating mode, using their technical knowledge.

Figure 4:
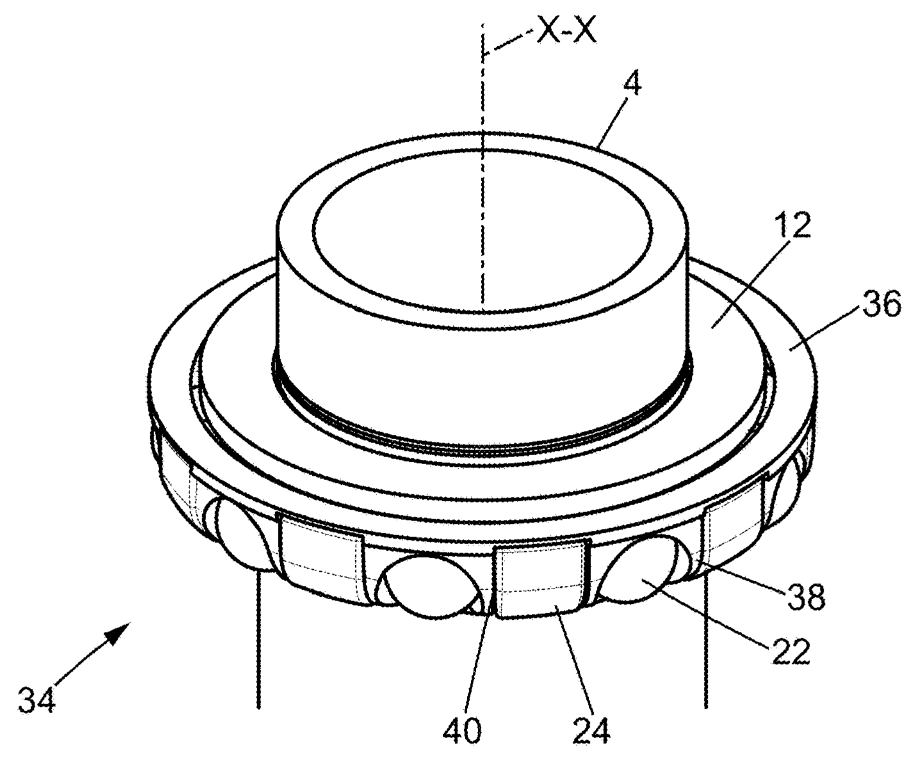
FIG. 4 is a side perspective view of a bearing according to a second embodiment, mounted around a shaft.

FIG. 4 shows a bearing 34 according to a second embodiment, comprising the same elements as bearing 2 according to the first embodiment. In addition, bearing 34 comprises a bearing cage 36 comprising first cells 38 and second cells 40. First cells 38 have a different shape than that of second cells 40. The first cells contain rolling elements 22. Second cells 40 contain intermediate blocks 24. Intermediate blocks 24 may be rigidly or flexibly secured or may remain free to move within a defined clearance in the second cells. Bearing 34 is mounted around a shaft 4. Outer race 10 and the hub have not been shown in FIG. 4.

In some embodiments, bearing cage 36 allows better separation and better angular distribution of rolling elements 22 and better positioning of intermediate blocks 24.

Figure 5:
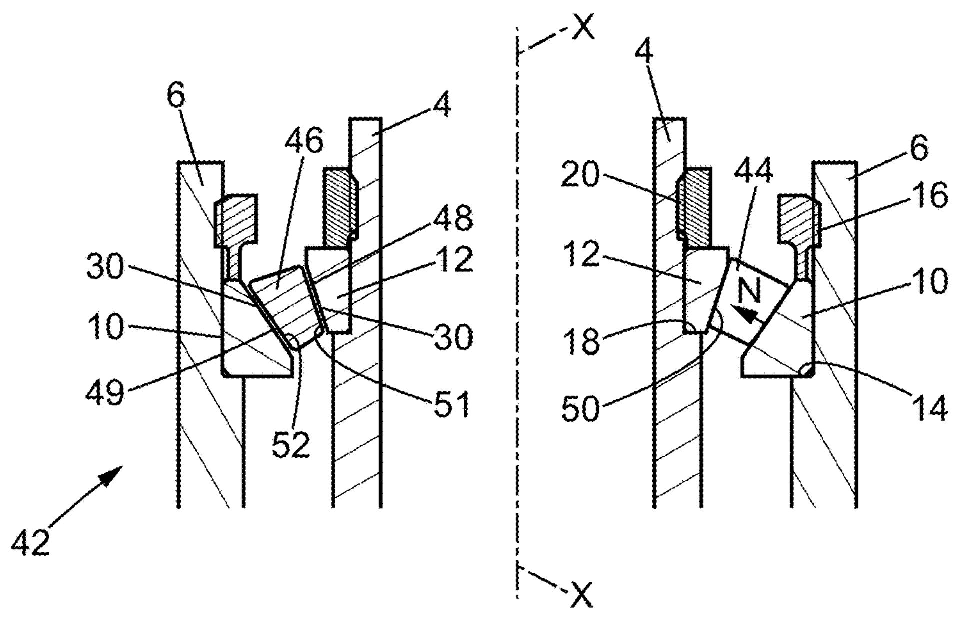
FIG. 5 is a cross-sectional view of a bearing assembly comprising a roller bearing according to a third embodiment of the disclosure, the cross-section being made in a plane radial to the axis of rotation of the bearing.
Figures 6, 7:
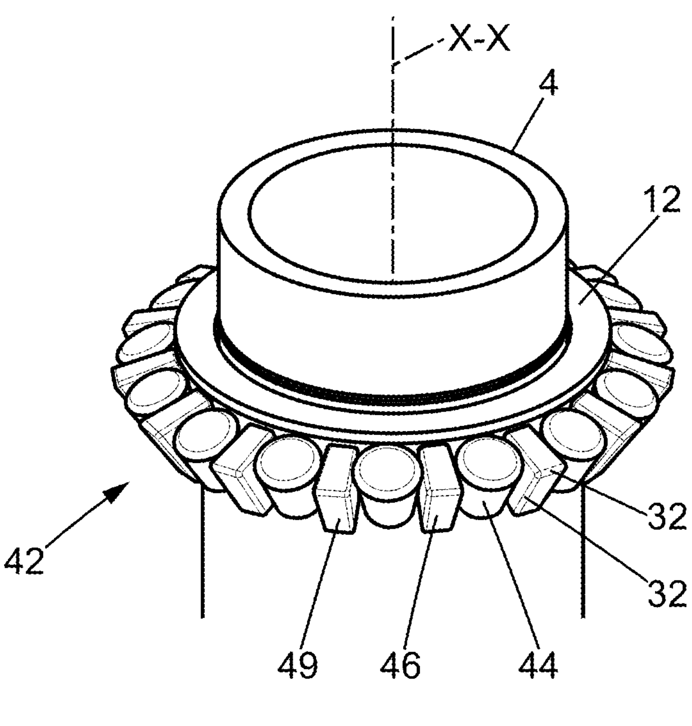
FIG. 6 is a side perspective view of the bearing assembly illustrated in FIG. 5, without the outer race and housing.
FIG. 7 is a top view of the bearing assembly illustrated in FIG. 5.

FIGS. 5 to 7 show a bearing 42 according to a third embodiment, comprising technical elements similar to the technical elements of bearing 2 according to the first embodiment. The technical elements of the third embodiment which are identical to the technical elements of the first embodiment are designated by the same references and are not described a second time. Unlike bearing 2 shown in FIGS. 1 to 3, rolling elements 44 of bearing 42 have the shape of tapered rollers. Intermediate blocks 46 have the general shape of a prism. Supporting faces 48, 49 of the intermediate blocks have a frustoconical shape.

Rolling tracks 50 also have a frustoconical shape. In the embodiment shown, intermediate blocks 46 have a dimension chosen so that their supporting faces 48 are facing the entire surface of a portion 51 of the rolling track of inner race 12 located facing the intermediate block.

FIGS. 10 to 13 show a bearing 60 according to a fourth embodiment, comprising technical elements similar to the technical elements of bearing 2 according to the first embodiment with the exception of the housing and the securing nuts. The technical elements of the fourth embodiment which are identical to the technical elements of the first embodiment are designated by the same references and are not described a second time. Unlike bearing 2 shown in FIGS. 1 to 3, rolling elements 62 of bearing 60 have the shape of a cylindrical roller or needle. Intermediate blocks 64 have the general shape of a prism. Supporting faces 66, 68 of the intermediate blocks have a cylindrical shape.

Figure 13:
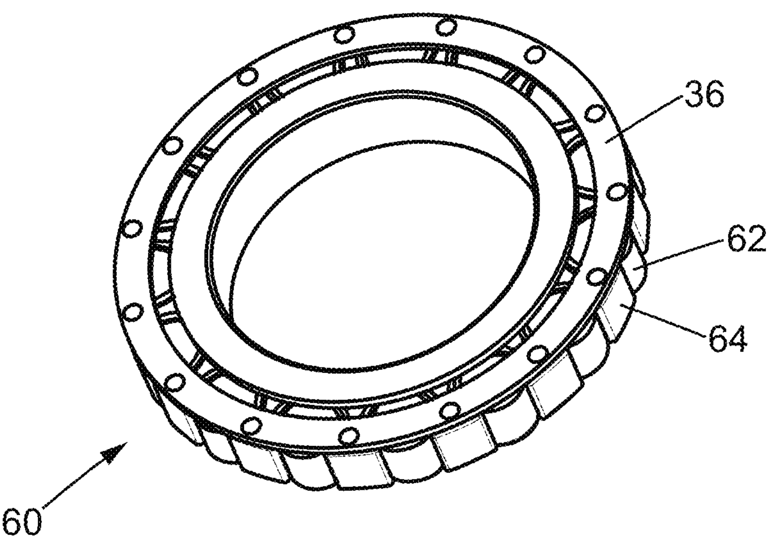
FIG. 13 is a perspective view of the bearing assembly illustrated in FIG. 10 and further comprising a bearing cage.

In the embodiment illustrated in FIG. 13, bearing 60 further comprises a bearing cage 36.

Embodiments of the disclosure also relate to a turbomachine module comprising a rotating shaft of longitudinal axis X-X, and a mechanical roller bearing for guiding the rotation of the rotating shaft about the longitudinal axis XX, the bearing being in accordance with the above.

Embodiments of the disclosure also relate to a turbomachine comprising a turbomachine module in accordance with the above description. The turbomachine comprises a set of parts which rotate slowly or are to be precisely oriented along an axis which itself rotates about an axis of a rapidly rotating main shaft. The parts in question are exposed to a field of centrifugal acceleration and other stresses which may vary suddenly.

Embodiments of the disclosure may be applied to:

- roller bearings having cylindrical, tapered, or spherical and toroidal tracks;
- thrust ball bearings with flat tracks;
- roller or ball slideways;
- needle bearings;
- 3- or 4-point contact ball bearings;
- roller bearings having internal play or internal clamping of the rolling elements; and
- bearings in which the extreme forces are not in the same direction as the forces during normal operation. In this last case, the shape of the races and intermediate blocks is adapted to the directions of the forces.

The invention claimed is:

1. A mechanical roller bearing, comprising:

two bearing races each having a rolling track;

rolling elements arranged between the races, the rolling elements being configured to roll against a portion of the rolling tracks, the rolling elements being made of a defined material; and a plurality of intermediate blocks arranged between the races, the intermediate blocks being made of a material having a greater stiffness than the stiffness of the material of the rolling elements at least in directions normal to the rolling tracks, when the bearing is subjected to loading below a threshold load, the intermediate blocks have a smaller dimension than the rolling elements in directions normal to the rolling tracks, wherein the races have a greater stiffness than the rolling elements, and wherein the intermediate blocks and the races are made of ceramic and the rolling elements are made of steel.

2. The mechanical roller bearing according to claim 1, wherein the intermediate blocks comprise supporting faces located facing the rolling tracks, wherein the supporting faces of the intermediate blocks have a shape complementary to the shape of the rolling tracks.

3. The mechanical roller bearing according to claim 1, wherein the intermediate blocks have rounded edges.

4. The mechanical roller bearing according to claim 1, wherein the intermediate blocks and the rolling elements are arranged so that they alternate.

5. The mechanical roller bearing according to claim 1, comprising a bearing cage having first cells and second cells, wherein the first cells have a different shape than that of the second cells, and wherein the first cells contain the rolling elements and the second cells contain the intermediate blocks.

6. The mechanical roller bearing according to claim 5, wherein the intermediate blocks are mounted to move freely within the second cells by a clearance being provided in the second cells around the intermediate blocks.

7. The mechanical roller bearing according to claim 1, wherein the rolling elements have a spherical shape, and wherein the shape of the intermediate blocks in cross-section is a diamond in which the obtuse angles are rounded with two opposite vertices of rounded shape, the cross-section being along a radial plane.

8. The mechanical roller bearing according to claim 1, wherein the rolling elements have the shape of a tapered roller, wherein the intermediate blocks comprise supporting faces located facing the rolling tracks, and wherein the supporting faces of the intermediate blocks have a frustoconical shape.

9. The mechanical roller bearing according to claim 1, wherein the rolling elements have the shape of a cylindrical roller or needle, wherein the intermediate blocks comprise supporting faces located facing the rolling tracks, and wherein the supporting faces of the intermediate blocks have a cylindrical shape.

10. A mechanical roller bearing, comprising:

two bearing races each having a rolling track;

rolling elements arranged between the races, the rolling elements being configured to roll against a portion of the rolling tracks, the rolling elements being made of a defined material; and a plurality of intermediate blocks arranged between the races, the intermediate blocks being made of a material having a greater stiffness than the stiffness of the material of the rolling elements at least in directions normal to the rolling tracks, wherein, when the bearing is subjected to loading below a threshold load, the intermediate blocks have a smaller dimension than the rolling elements in directions normal to the rolling tracks, wherein the races have a greater stiffness than the rolling elements and wherein the rolling elements have a spherical shape, and wherein the shape of the intermediate blocks in cross-section is a diamond in which the obtuse angles are rounded with two opposite vertices of rounded shape, the cross-section being along a radial plane.

11. The mechanical roller bearing according to claim 10, wherein the intermediate blocks have rounded edges.

12. The mechanical roller bearing according to claim 10, wherein the intermediate blocks and the rolling elements are arranged so that they alternate.

13. The mechanical roller bearing according to claim 10, wherein the intermediate blocks and the races are made of a material containing ceramic or steel, and wherein the rolling elements are made of a nickel-titanium alloy.

14. The mechanical roller bearing according to claim 10, wherein comprising a bearing cage having first cells and second cells, wherein the first cells have a different shape than that of the second cells, and wherein the first cells contain the rolling elements and the second cells contain the intermediate blocks.

15. A mechanical roller bearing, comprising:

two bearing races each having a rolling track;

rolling elements arranged between the races, the rolling elements being configured to roll against a portion of the rolling tracks, the rolling elements being made of a defined material; and a plurality of intermediate blocks arranged between the races, the intermediate blocks being made of a material having a greater stiffness than the stiffness of the material of the rolling elements at least in directions normal to the rolling tracks, wherein, when the bearing is subjected to loading below a threshold load, the intermediate blocks have a smaller dimension than the rolling elements in directions normal to the rolling tracks, wherein the races have a greater stiffness than the rolling elements and wherein the rolling elements have the shape of a tapered roller, and wherein the intermediate blocks comprise supporting faces located facing the rolling tracks, the supporting faces of the intermediate blocks having a frustoconical shape.

16. The mechanical roller bearing according to claim 15, wherein the intermediate blocks have rounded edges.

17. The mechanical roller bearing according to claim 15, wherein the intermediate blocks and the rolling elements are arranged so that they alternate.

18. The mechanical roller bearing according to claim 15, wherein the intermediate blocks and the races are made of a material containing ceramic or steel, and wherein the rolling elements are made of a nickel-titanium alloy.

19. The mechanical roller bearing according to claim 15, further comprising a bearing cage having first cells and second cells, wherein the first cells have a different shape than that of the second cells, and wherein the first cells contain the rolling elements and the second cells contain the intermediate blocks.

* * * * *